US010689557B2

(12) United States Patent
Ploense

(10) Patent No.: US 10,689,557 B2
(45) Date of Patent: Jun. 23, 2020

(54) ASPHALT WATER-BASED DRILLING FLUID ADDITIVE

(71) Applicant: Owens Corning Intellectual Capital, LLC, Toledo, OH (US)

(72) Inventor: David Michael Ploense, Downers Grove, IL (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 63 days.

(21) Appl. No.: 15/694,034

(22) Filed: Sep. 1, 2017

(65) Prior Publication Data

US 2018/0066173 A1 Mar. 8, 2018

Related U.S. Application Data

(60) Provisional application No. 62/382,898, filed on Sep. 2, 2016.

(51) Int. Cl.

| C09K 8/035 | (2006.01) |
| C09K 8/10 | (2006.01) |
| C09K 8/12 | (2006.01) |
| C08L 95/00 | (2006.01) |
| C08L 1/26 | (2006.01) |
| C08K 3/20 | (2006.01) |
| C09K 8/04 | (2006.01) |

(52) U.S. Cl.
CPC .............. C09K 8/035 (2013.01); C08K 3/20 (2013.01); C08L 1/26 (2013.01); C08L 95/005 (2013.01); C09K 8/04 (2013.01); C09K 8/10 (2013.01); C09K 8/12 (2013.01); C08L 2555/84 (2013.01)

(58) Field of Classification Search
None
See application file for complete search history.

(56) References Cited

U.S. PATENT DOCUMENTS

| 4,496,474 A | 1/1985 | Reck |
| 5,120,708 A | 6/1992 | Melear et al. |
| 2006/0019834 A1* | 1/2006 | Melbouci ................ C09K 8/04 507/100 |

(Continued)

FOREIGN PATENT DOCUMENTS

| CN | 103131199 | * 5/2013 |
| WO | 1995/030818 | 11/1995 |

OTHER PUBLICATIONS

Transportation Research Circular, No. E-C102, Aug. 2006, Asphalt Emulsion Technology, 58 pgs.

*Primary Examiner* — Jeffrey D Washville
(74) *Attorney, Agent, or Firm* — Calfee, Halter & Griswold LLP

(57) ABSTRACT

An emulsified drilling fluid additive includes an emulsion of asphalt, at least one emulsifier, cellulose ether, and water. The asphalt has a softening point of 160 to 212° F., a penetration depth of 0 to 45 mm, and a viscosity of 200 to 800 cP at 350° F. The drilling fluid additive has an average particle size of 0.1-10 microns. The drilling fluid has an API fluid loss at 7.5 minutes of 0 to 0.5 mL and an API fluid loss at 30 minutes of 0 to 3.5 mL. A method of making the drilling fluid additive includes mixing at least one emulsifier, cellulose ether, and water to form a solution, heating a water-dispersible asphalt to above 300° F. and adding the asphalt to the water-based solution in a colloid mill to form an emulsion.

20 Claims, 1 Drawing Sheet

(56) References Cited

U.S. PATENT DOCUMENTS

2010/0173805 A1* 7/2010 Pomerleau .......... B01F 17/0014
507/138
2014/0336085 A1* 11/2014 Bishop .................. C09K 8/035
507/126

* cited by examiner

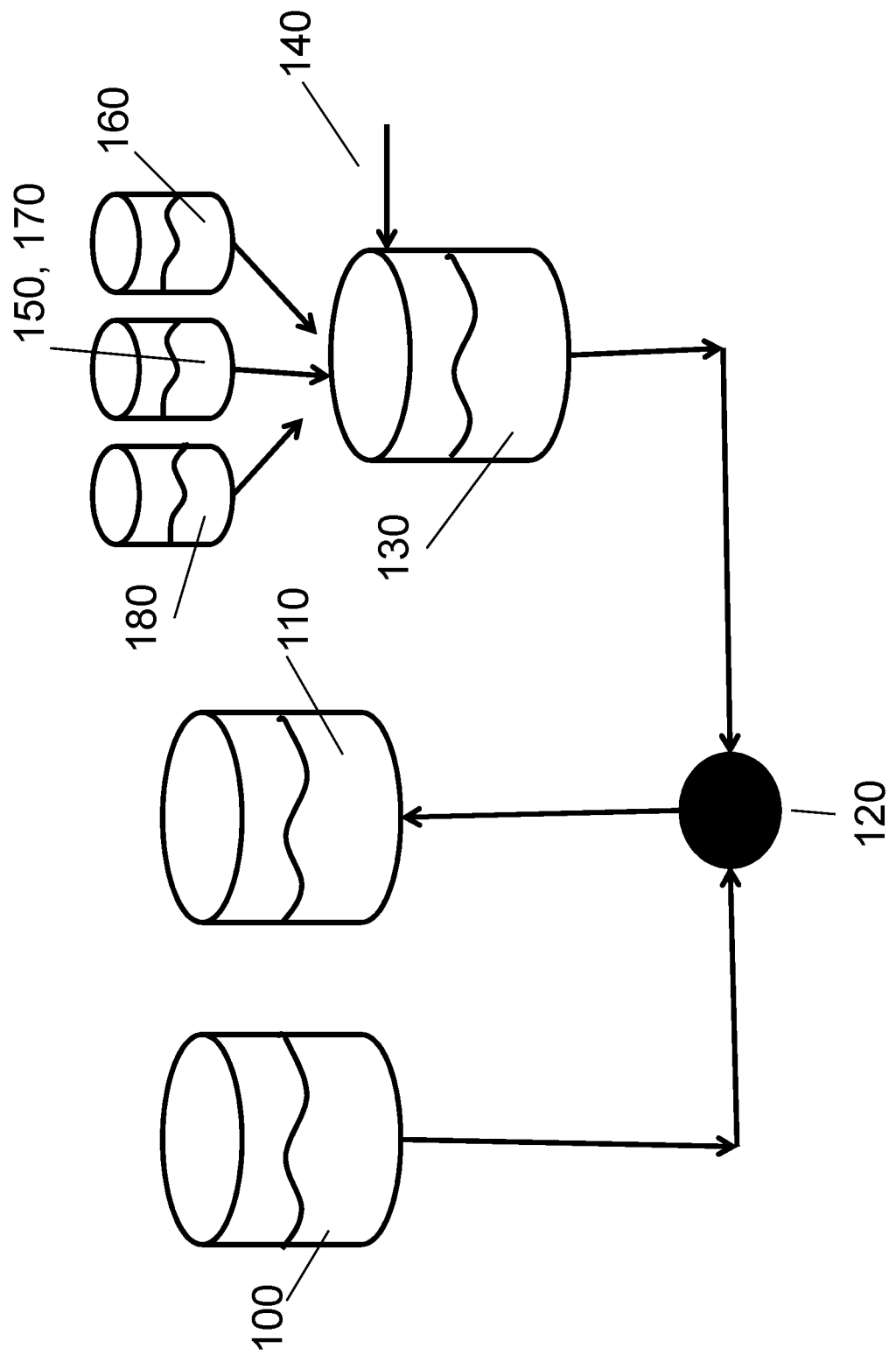

ASPHALT WATER-BASED DRILLING FLUID ADDITIVE

TECHNICAL FIELD

The present disclosure relates generally to asphalt drilling fluid additives for water-based drilling systems, and more particularly, to asphalt emulsions and methods for producing the same for use as a drilling fluid additives for water-based fluid drilling systems.

BACKGROUND

A drilling apparatus is comprised of a column of drill pipes with a drill bit attached. In a drilling operation, the column of drill pipes is rotated to cut a bore hole into the earth, which generates cuttings. To remove cuttings and form a cleared bore hole, a drilling fluid or mud is circulated down a drill pipe, exits at the bit, and is circulated up the bore hole in the annulus between the outside of the drill string and the wall of the bore hole. This circulation of the drilling mud removes cuttings made by the bit from the bottom of the hole and lifts them to the surface for disposal. A water-based drilling mud includes water as the continuous phase as well as other material(s) in the dispersed phase.

SUMMARY

Various exemplary embodiments of the present inventive concepts are directed to an additive for a water-based drilling mud or fluid. In some exemplary embodiments, drilling fluid additive including asphalt, at least one emulsifier, cellulose ether, and water. The asphalt has a softening point of 160° F. to 212° F., including without limitation, 170° F. to 200° F., 180° F. to 195° F., and 189° F. to 196° F. The asphalt has a penetration depth of 0 to 45 mm, including without limitation, 0 to 40 mm, 5 mm to 35 mm, 10 mm to 30 mm, 15 mm to 25 mm, and 15 mm to 37.5 mm. The asphalt has a viscosity of 200 cP to 800 cP at 350° F., including without limitation, 300 cP to 700 cP, 400 cP to 600 cP, 500 cP to 600 cP, 520 cP to 580 cP, 540 cP to 560 cP, 550 cP to 555 cP. In some exemplary embodiments, the drilling fluid additive has an average particle size of 0.1-10 microns, including without limitation, 1-8 microns, 2-7 microns, 5-7 microns, and 2-3 microns. In some exemplary embodiments, the drilling fluid additive comprises 50-70% by weight asphalt; 0.5-10% by weight emulsifier; 0.05-0.5% by weight cellulose ether; 0.1-1.0% by weight solution having 50% (w/v) NaOH. In some exemplary embodiments, the drilling fluid additive further comprises an acid neutralizer or an alkali neutralizer. In some exemplary embodiments, the acid neutralizer is one or more of hydrochloric acid and phosphoric acid. In some exemplary embodiments, the alkali neutralizer is one or more of sodium hydroxide and potassium hydroxide.

In some exemplary embodiments, a drilling fluid comprises a drilling fluid additive having an emulsion including asphalt, at least one emulsifier, cellulose ether, and water. The asphalt has a softening point of 160° F. to 212° F., including without limitation, 170° F. to 200° F., 180° F. to 195° F., and 189° F. to 196° F. The asphalt has a penetration depth of 0 to 45 mm, including without limitation, 0 to 40 mm, 5 mm to 35 mm, 10 mm to 30 mm, 15 mm to 25 mm, and 15 mm to 37.5 mm. The asphalt has a viscosity of 200 cP to 800 cP at 350° F., including without limitation, 300 cP to 700 cP, 400 cP to 600 cP, 500 cP to 600 cP, 520 cP to 580 cP, 540 cP to 560 cP, 550 cP to 555 cP. In some exemplary embodiments, the drilling fluid additive has an average particle size of 0.1-10 microns, including without limitation, 1-8 microns, 2-7 microns, 5-7 microns, and 2-3 microns. In certain embodiments, the asphalt includes at least one of propane distilled asphalt or polymer modified asphalt. In certain embodiments, drilling fluid has an API fluid loss at 7.5 minutes of 0 to 0.5 mL, including without limitation, 0.1 to 0.4, 0.2 to 0.3, and 0.3 to 0.4 mL. In some exemplary embodiments, the drilling fluid has an API fluid loss at 30 minutes of 0 to 3.5 mL, including without limitation, 0 to 0.5, 0.5 to 3, 1 to 2.5, and 1.5 to 2 mL. In some exemplary embodiments, the drilling fluid has an API Filter cake thickness of 0.5 to 3 mm, including without limitation, 0.5 to 3, 1 to 2.5, and 1.5 to 2 mm. In some exemplary embodiments, the drilling fluid has an HTHP fluid loss of 0 to 3.5 mL per 30 min at 250° F., including without limitation, 0 to 0.5, 0.5 to 3, 1 to 2.5, and 1.5 to 2 mL. In some exemplary embodiments, the drilling fluid has an HTHP Filter cake thickness of 0.5 to 3.5 mm, including without limitation, 0.5 to 3, 1 to 2.5, and 1.5 to 2 mm.

In some exemplary embodiments, a method of making a drilling fluid additive is disclosed as comprising the steps of mixing at least one emulsifier, cellulose ether, and water to form a solution heating a water-dispersible asphalt to above 300° F. wherein the asphalt has a softening point of 160-212° F.; and adding the asphalt to the water-based solution in a colloid mill to form an emulsion. The asphalt has a softening point of 160 to 212° F., including without limitation, 170° F. to 200° F., 180° F. to 195° F., and 189° F. to 196° F. In some exemplary embodiments, the asphalt has a penetration depth that does not exceed 45 mm, including without limitation, 0 to 40 mm, 5 mm to 35 mm, 10 mm to 30 mm, 15 mm to 25 mm, and 15 mm to 37.5 mm. In some exemplary embodiments, the asphalt has a viscosity of 200 cP to 800 cP at 350° F., including without limitation, 300 cP to 700 cP, 400 cP to 600 cP, 500 cP to 600 cP, 520 cP to 580 cP, 540 cP to 560 cP, 550 cP to 555 cP. The emulsion has an average particle size of 0.1-10 microns, including without limitation, 1-8 microns, 2-7 microns, 5-7 microns, and 2-3 microns.

Additional features and advantages will be set forth in part in the description that follows, and in part may be apparent from the description, or may be learned by practice of the exemplary embodiments disclosed herein. The objects and advantages of the exemplary embodiments disclosed herein will be realized and attained by means of the elements and combinations particularly pointed out in the appended claims. It is to be understood that both the foregoing summary and the following detailed description are exemplary and explanatory only and are not restrictive of the general inventive concepts as disclosed herein or as otherwise claimed.

DESCRIPTION OF THE DRAWING

Exemplary embodiments of the disclosure will be apparent from the more particular description of certain embodiments provided below and as illustrated in the accompanying drawing.

The FIGURE is a schematic of view of methods and compositions for producing the asphalt emulsion according to the present invention.

DETAILED DESCRIPTION

Unless otherwise defined, all technical and scientific terms used herein have the same meaning as commonly understood by one of ordinary skill in the art to which these exemplary embodiments belong. The terminology used in the description herein is for describing particular exemplary embodiments only and is not intended to be limiting of the exemplary embodiments.

As used in the specification and the appended claims, the singular forms "a," "an," and "the" are intended to include the plural forms as well, unless the context clearly indicates otherwise.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

The general inventive concepts are directed to distilled asphalt or polymer modified asphalt emulsions used as additives for water-based drilling muds or fluids. The asphalt emulsion can be used as an additive for drilling mud, i.e., drilling fluids, to reduce fluid loss and stabilize the bore in a subterranean oil and gas well under certain conditions and in certain geologic formations. The asphalt emulsions are mixed into water-based drilling muds to provide viscosity and/or wall building properties.

An asphalt is the residual product of nondestructive distillation of crude oil in petroleum refining. An asphalt emulsion is a heterogeneous system with two or more liquid phases, made up of a continuous liquid phase (water) and at least a second liquid phase (asphalt) dispersed in the continuous liquid phase in fine droplets.[1] An asphalt emulsion is made by mixing hot asphalt, also known as bitumen, with water containing emulsifying agents and applying mechanical energy sufficient to break up the asphalt into droplets.

[1] Transportation Research Circular E-C102, Asphalt Emulsion Technology, Assembled by Delmar R. Salomon for the Transportation Research Board Characteristics of Bituminous Materials Committee, August 2006.

Referring to FIGURE, during the emulsion process, the emulsifier (160) is dissolved in the water phase. Water (140) is introduced via a water source. Because emulsifiers are often supplied in a water-insoluble form, an acid neutralizer (150) or an alkali (base) neutralizer (170) is needed to generate the anionic or cationic water-soluble form used in a soap solution (130). In some exemplary embodiments, the asphalt emulsion further comprises an acid neutralizer or an alkali neutralizer. In some exemplary embodiments, the acid neutralizer includes hydrochloric acid or phosphoric acid. In some exemplary embodiments, the alkali neutralizer includes sodium hydroxide or potassium hydroxide. In an exemplary embodiment, the soap solution has a pH of 10-12.

Further, one or more stabilizers (180) can be added to the water phase. This water solution or "soap" solution (130) is formed from the emulsifier (160), an acid neutralizer (150) or alkali (base) neutralizer (170), one or more stabilizers (180), and water (140), which is mixed with the hot liquid asphalt (100) in a colloid mill (120) to form an emulsion (110).

Liquid drilling fluids or drilling muds are typically in the form of a suspension in which fine particles of solid materials are mixed throughout the liquid. In water-based muds, water is the liquid and is said to be the continuous phase, while the particles are the dispersed phase. High softening point hard asphalt has been used in oil and water-based drilling fluid systems in the past as suspended solids. Surprisingly, the emulsion described herein results in very small asphalt particles (average particle size of 0.1-10 microns) that will readily coat the bore in problematic geologic formations, compared to the larger particle sizes of other asphalts on the market which typically have an average particle size of 10-100 microns. Additionally, due to the fact that the emulsion is used in water-based drilling fluids, the asphalt used will require a lower softening point (ring and ball softening points in the range of 160° F. and 212° F.) than the higher softening point asphalt currently on the market, which is typically 230° F.

In some exemplary embodiments, the drilling fluid comprises a drilling fluid additive having an emulsion including asphalt, at least one emulsifier, cellulose ether, and water. In some exemplary embodiments, the drilling fluid has an American Petroleum Institute ("API") fluid loss at 7.5 minutes of 0 to 0.5 mL, including without limitation, 0.1 to 0.4, 0.2 to 0.3, and 0.3 to 0.4 mL. In some exemplary embodiments, the drilling fluid has an API fluid loss at 30 minutes of 0 to 3.5 mL, including without limitation, 0 to 0.5, 0.5 to 3, 1 to 2.5, and 1.5 to 2 mL. In some exemplary embodiments, the drilling fluid has an API Filter cake thickness of 0.5 to 3 mm, including without limitation, 0.5 to 3, 1 to 2.5, and 1.5 to 2 mm. In some exemplary embodiments, the drilling fluid has a High Temperature High Pressure ("HTHP") fluid loss of 0 to 3.5 mL per 30 min at 250° F., including without limitation, 0 to 0.5, 0.5 to 3, 1 to 2.5, and 1.5 to 2 mL. In some exemplary embodiments, the drilling fluid has an HTHP Filter cake thickness of 0.5 to 3.5 mm, including without limitation, 0.5 to 3, 1 to 2.5, and 1.5 to 2 mm.

In some exemplary embodiments, the asphalt for use in water-based drilling fluid systems for oil and gas well drilling as disclosed herein includes one or more of distilled asphalt (e.g., hard asphalt, propane distilled asphalt, oxidized asphalt) and polymer modified asphalt ("PMA"). In some exemplary embodiments, the asphalt has a ring and ball softening point between 160° F. to 212° F., including without limitation, 170° F. to 200° F., 180° F. to 195° F., and 189° F. to 196° F. In some exemplary embodiments, the asphalt has a ring and ball softening point of at least 189° F. The ring and ball softening point refers to a method of determining the softening point of the asphalt. Generally for the ring and ball softening test a specimen is cast or molded inside a ring of metal with dimensions 15.875 mm inside diameter by 2.38 mm thick by 6.35 mm deep. This ring is placed above a metal plate in a fluid heating bath, and a 9.5 mm diameter steel ball weighing 3.5 grams is placed in the center of the specimen. The softening point is considered to be the temperature of the fluid when the ball penetrates the specimen and touches the lower plate. In some exemplary embodiments, the asphalt has a penetration depth that does not exceed 45 mm, including without limitation, 0 to 40 mm, 5 mm to 35 mm, 10 mm to 30 mm, 15 mm to 25 mm, and 15 mm to 37.5 mm. In some exemplary embodiments, the asphalt has a viscosity of 200 cP to 800 cP at 350° F., including without limitation, 300 cP to 700 cP, 400 cP to 600 cP, 500 cP to 600 cP, 520 cP to 580 cP, 540 cP to 560 cP, 550 cP to 555 cP at 350° F. The resulting asphalt emulsion is stable with a high softening point. The emulsified propane distilled asphalt or PMA having the above identified softening point is suitable for oil and gas drilling wells operating at temperatures less than 250° F. and is suitable for water-based drilling fluids.

In some exemplary embodiments, the asphalt comprises a polymer modified asphalt. Thus, in certain embodiments the asphalt comprises one or more polymer modifiers. In some exemplary embodiments, the polymer modifier comprises any suitable polymer. In some exemplary embodiments, the polymer modifier comprises an elastomeric radial polymer, an elastomeric linear polymer, a linear copolymer, radial copolymer or combinations thereof. In some exemplary embodiments, the polymer modifier comprises styrene-butadiene-styrene (SBS), styrene-butadiene rubber (SBR), styrene-isoprene-styrene (SIS), thermoplastic polyolefin (TPO) or combinations thereof.

In some exemplary embodiments, the asphalt emulsion comprises 50-70% by weight asphalt; 0.5-10% by weight emulsifier; 0.05-0.5% by weight cellulose ether; 0.1-1.0% by weight solution having 50% (w/v) NaOH; and 25-50% water.

A wide variety of stabilizers may be used to prepare the asphalt emulsion. In certain embodiments, the stabilizer includes a cellulose, including without limitation, a non-ionic water soluble cellulose ether. In some exemplary embodiments, the cellulose ether includes high viscosity ethyl hydroxyethyl cellulose like Bermocoll-EM 7000FQ, available from AkzoNobel, headquartered in Amsterdam, the Netherlands.

A wide variety of emulsifiers may be used in the asphalt emulsion. In certain embodiments, the emulsifier includes a lower odor adhesion promoter, anionic rapid setting emulsifier, a medium setting emulsifier, a slow setting emulsifier, and/or mixtures thereof. The terms rapid setting emulsifier, medium setting emulsifier, and slow setting emulsifier are used herein in a manner consistent with the understanding of one of ordinary skill in the art in the context of asphalt emulsions. In certain embodiments, the emulsifier is Redicote E-7000, Redicote E-6945, and/or Redicote AP, all of which are available from AkzoNobel, headquartered in Amsterdam, the Netherlands.

The asphalt emulsion may have a range of particle sizes. In certain embodiments, the asphalt emulsion used as a drilling fluid additive has an average particle size of 0.1-10 microns, including without limitation, 1-8 microns, 2-7 microns, 5-7 microns, and 2-3 microns.

In some exemplary embodiments, the method of making an asphalt emulsion includes the steps of at least one emulsifier, cellulose ether, and water to form a solution. In some exemplary embodiments, a water-dispersible asphalt is then be heated to above 300° F., wherein the asphalt has a softening point of 160-212° F., a softening point of 160 to 212° F., a penetration depth of 0 to 45 mm, and a viscosity of 200 to 800 cP at 350° F. In some exemplary embodiments, the asphalt is added to the water-based solution in a colloid mill to form an emulsion, wherein the emulsion has an average particle size of 0.1-10 microns, including without limitation, 1-8 microns, 2-7 microns, 5-7 microns, and 2-3 microns. The method may further include the step of adding an acid or alkali neutralizer to the emulsifier. Additionally, in some exemplary embodiments, the method comprises the step of adding one or more stabilizers to the water-based solution. In certain embodiments, the asphalt is treated with propane in a de-asphalting unit. In certain embodiments, the asphalt is further reacted with oxygen.

In some exemplary embodiments, the method for producing an asphalt emulsion for a water-based drilling fluid additive includes heating the asphalt to a temperature above 300° F., dissolving at least one emulsifier in a continuous phase to form a soap solution, adding a stabilizer to the continuous phase, and incorporating the asphalt into the soap solution thereby forming an emulsion, the emulsion having an average particle size of 0.1-10 microns, including without limitation, 1-8 microns, 2-7 microns, 5-7 microns, and 2-3 microns. In certain embodiments, the continuous phase is water. In some exemplary embodiments, the emulsion is passed through a heat exchanger. In some exemplary embodiments the additive is then incorporated into a drilling fluid. In certain embodiments, the at least one emulsifier is in a water insoluble form and further comprise the step of neutralizing the at least one emulsifier with an acid or an alkali neutralizer. In certain embodiments, the at least one emulsifier comprises at least one of an anionic rapid setting emulsifier, a medium setting emulsifier, a slow setting emulsifier, or mixtures thereof.

In some exemplary embodiments, the acid neutralizer is hydrochloric acid or phosphoric acid. In some exemplary embodiments, the alkali neutralizer is sodium hydroxide or potassium hydroxide. The soap solution may have a pH of 10-12.

EXAMPLES

The following examples further describe and demonstrate embodiments within the scope of the present disclosure. The examples are given solely for the purpose of illustration and are not to be construed as limitations of the present disclosure, as many variations thereof are possible without departing from the spirit and scope of the disclosure.

Example 1

A polymer modified asphalt base (Ref. No. 515-1E (SU #12580-16)) with a softening point of 189° F., a penetration depth of 37.5 mm, a viscosity of 550 cP at 350° F. was mixed with NaOH and water. The polymer modified asphalt was treated with 0.5% Redicote AP prior to emulsification. This combination was emulsified at 57% residue using the following emulsifiers: 1% Redicote E-7000, 3% Redicote E-6945 and 0.1% Bermocoll BM-7000FQ. The percent residue is the percent of asphalt in the emulsion based on the total weight of the sample. An elevated temperature was required to emulsify the polymer modified asphalt. The finished emulsion was smooth and viscous with fine particles having a median particle size of 2.08 microns.

Example 2

An oxidized asphalt base (Ref. No. 445-1E (SU #12579-16)) having a softening point of 196° F. and a penetration depth of 15 mm was mixed with NaOH with PMA and water. The oxidized asphalt was treated with 0.5% Redicote AP prior to emulsification. This combination was emulsified at 57% residue using the following emulsifiers: 1% Redicote E-7000, 3% Redicote E-6945 and 0.1% Bermocoll BM-7000FQ. An elevated temperature was required to emulsify the oxidized asphalt. The finished emulsion had a median particle size of 6.96 microns.

Table 1 illustrates exemplary embodiments of the asphalt emulsions of Examples 1 and 2. All percentages are weight percentages unless otherwise noted. Table 2 illustrates exemplary processing conditions for the asphalt emulsions. Table 3 illustrates volume-based particle sizes distributions of the asphalt emulsions measured in microns.

TABLE 1

Asphalt Emulsion Formulation.

|  | Example 1 | Example 2 |
|---|---|---|
| Polymer Modified Asphalt | 57.0% | 57.0% |
| Redicote E-7000 | 1.0% | 1.0% |
| Redicote E-6945 | 3.0% | 3.0% |
| Bermocoll EM-7000FQ | 0.1% | 0 |
| Redicote AP | 0.5% | 0.5% |
| 50% NaOH solution | 0.52% | 0.6% |
| Water | Q.S. | Q.S. |
| Soap pH | 12.0 | 12.4 |

TABLE 2

Asphalt Emulsion Process Conditions and Test Results.

| Process Conditions: | Example 1 | Example 2 |
|---|---|---|
| Asphalt flow, l/h | 174 | 174 |
| Asphalt temperature, °C. | 178 | 175 |
| Soap flow, l/h | 126 | 124 |
| Soap temperature, °C. | 67 | 70 |
| Emulsion temperature, °C. | | |
| Before heat exchanger | 112 | 112 |
| After heat exchanger | 95 | 93 |
| Back pressure, bar | 1.5 | 1.5 |

TABLE 2-continued

Asphalt Emulsion Process Conditions and Test Results.

| Process Conditions: | Example 1 | Example 2 |
|---|---|---|
| Test Results: | | |
| Residual Asphalt, pct. | 57.1 | 57.2 |
| pH of emulsion | 12.6 | 12.8 |

TABLE 3

Asphalt Emulsion Particle Size.

| Particle size (microns) | Example 1 | Example 2 |
|---|---|---|
| 10% volume> | 1.173 | 1.81 |
| 25% volume> | 1.5 | 3.625 |
| 50% volume> | 2.076 | 5.528 |
| 75% volume> | 3.292 | 7.965 |
| 90% volume> | 5.757 | 10.78 |
| Median | 2.076 | 5.528 |
| Mean | 2.824 | 6.961 |

Performance tests were conducted on the two samples of the asphalt emulsion formulations listed in Table 1 (Example 1 and Example 2) in a water-based drilling fluid. Additional testing was performed on a sulfonated asphalt as a comparative example (hereinafter identified as, Comparative Sample A). The sulfonated asphalt is a sodium asphalt sulfonate sold under the trademark Soltex, which is available from Drilling Specialties Company, a division of the Chevron Phillips Chemical Company located in The Woodlands, Tex. Tables 4 through 6 outline the procedures used to prepare each sample. Table 7 details the fluid loss test results. These results were obtained using the API fluid loss test and the High Temperature High Pressure ("HTHP") fluid loss test. The American Petroleum Institute ("API") fluid loss test was conducted following the procedures outline in API Recommended Procedure, API RP 13B-1, which are incorporated herein by reference. The HTHP fluid loss test was conducted at 250° F. and 600 psi (4,140 kPa) using 10 micron aloxite discs. As illustrated in Table 7, the water-based filling mud made with the Example 1 and Example 2 additives, exhibit similar or superior fluid retention when compared to the sulfonated asphalt of Comparative Sample A.

TABLE 4

Preparation of Water-based Drilling Fluid of Example 2.

| Material | Amount Added | Procedure |
|---|---|---|
| Tap Water | 340 grams | Add the tap water to a mixing container. |
| Sodium Bicarbonate | 1.6 grams | Slowly add sodium bicarbonate and mix for 5 minutes. |
| Bentonite | 5 grams | Slowly add bentonite and let hydrate for 16 hours. |
| Aquagel | 10 grams | Slowly add aquagel and mix for 5 minutes. |
| Sodium Carboxymethyl Cellulose Low viscosity-CMC-LV | 5 grams | Slowly add CMC-LV and mix for 5 minutes. |
| 230048 (SU #12579-16) | 10 grams | Slowly add 230048 and mix for 5 minutes. |
| Barite | up to mud weight of 12 pounds per gallon (ppg) | Slowly add barite and mix for 5 minutes. Hot Roll for 16 hours at 150° F. |

TABLE 5

Preparation of Water-based Drilling Fluid of Example 1.

| Material | Amount Added | Procedure |
|---|---|---|
| Tap Water | 340 grams | Add the tap water to a mixing container. |
| Sodium Bicarbonate | 1.6 grams | Slowly add sodium bicarbonate and mix for 5 minutes. |
| Bentonite | 5 grams | Slowly add bentonite and let hydrate for 16 hours. |
| Aquagel | 10 grams | Slowly add aquagel and mix for 5 minutes. |
| Sodium Carboxymethyl Cellulose Low viscosity-CMC-LV | 5 grams | Slowly add CMC-LV and mix for 5 minutes. |
| 230049 (SU #12580-16) | 10 grams | Slowly add 230049 and mix for 5 minutes. |
| Barite | up to mud weight of 12 pounds per gallon (ppg) | Slowly add barite and mix for 5 minutes. |
| | | Hot Roll for 16 hours at 150° F. |

TABLE 6

Preparation of Water-based Drilling Fluid of Comparative Sample A.

| Material | Amount Added | Procedure |
|---|---|---|
| Tap Water | 340 grams | Add the tap water to a mixing container |
| Sodium Bicarbonate | 1.6 grams | Slowly add sodium bicarbonate and mix for 5 minutes. |
| Bentonite | 5 grams | Slowly add bentonite and let hydrate for 16 hours. |
| Aquagel | 10 grams | Slowly add aquagel and mix for 5 minutes. |
| Sodium Carboxymethyl Cellulose Low viscosity-CMC-LV | 5 grams | Slowly add CMC-LV and mix for 5 minutes. |
| Soltex | 10 grams | Slowly add Soltex and mix for 5 minutes. |
| Barite | up to mud weight of 12 pounds per gallon (ppg) | Slowly add barite and mix for 5 minutes. |
| | | Hot Roll for 16 hours at 150° F. |

TABLE 7

Water-based Drilling Fluid Test Results.

| | Example 2 | Example 1 | Comparative Sample A |
|---|---|---|---|
| API Fluid Loss at 7.5 minutes (mL) | 0.2 | 0.0 | 0.0 |
| API Fluid Loss at 30 minutes (mL) | 2.4 | 1.9 | 1.9 |
| API Filter cake Thickness (mm) | 1.0 | 1.0 | 3.0 |
| High Temperature/High Pressure Fluid Loss @ 250° F. (mL/30 min) | 0.0 | 1.2 | 5.4 |
| HTHP Filter cake Thickness (mm) | 1.5 | 2.0 | 4.5 |

Although the present invention has been described with reference to particular means, materials and embodiments, from the foregoing description, one skilled in the art can easily ascertain the essential characteristics of the present disclosure and various changes and modifications can be made to adapt the various uses and characteristics without departing from the spirit and scope of the present invention as described above and set forth in the attached claims.

The invention claimed is:

1. A drilling fluid additive comprising:
an emulsion including
50% to 70% by weight asphalt,
0.5% to 10% by weight of at least one emulsifier,
0.05% to 0.5% by weight cellulose ether, and
25% to 50% by weight water;
wherein the asphalt has a softening point of 160° F. to 212° F., a penetration depth of 0 mm to 45 mm, and a viscosity of 200 cP to 800 cP at 350° F.; and
wherein the drilling fluid additive includes asphalt particles with an average particle size of 0.1 micron to 10 microns.

2. The drilling fluid additive of claim 1, wherein the asphalt includes at least one of propane distilled asphalt or polymer modified asphalt.

3. The drilling fluid additive of claim 1, further comprising an acid neutralizer or an alkali neutralizer.

4. The drilling fluid additive of claim 3, wherein the drilling fluid additive includes and the acid neutralizer and the acid neutralizer is hydrochloric acid or phosphoric acid.

5. The drilling fluid additive of claim 3, wherein the drilling fluid additive includes and the alkali neutralizer and the alkali neutralizer is sodium hydroxide or potassium hydroxide.

6. The drilling fluid additive of claim 1, wherein the emulsion further comprises:
0.1% to 1.0% by weight of a 50% (w/v) NaOH solution.

7. The drilling fluid additive of claim 2, wherein a modifier in the polymer modified asphalt includes at least one of an elastomeric radial polymer, linear polymer, linear copolymer, radial copolymer, or combinations thereof.

8. The drilling fluid additive of claim 2, wherein a modifier in the polymer modified asphalt includes at least one of styrene-butadiene-styrene, styrene-butadiene rubber, styrene-isoprene-styrene, thermoplastic polyolefin, or combinations thereof.

9. The drilling fluid additive of claim 1, wherein the asphalt has a softening point of 189° F. to 196° F.

10. A water-based drilling fluid comprising:
a continuous phase that is a water phase; and
a drilling fluid additive having an emulsion including asphalt, at least one emulsifier, cellulose ether, and water, wherein the drilling fluid additive has a weight ratio of the asphalt to the at least one emulsifier to the cellulose ether of 50-70:0.5-10:0.05-0.5;
wherein the asphalt has a softening point of 160° F. to 212° F., a penetration depth of 0 mm to 45 mm, and a viscosity of 200 cP to 800 cP at 350° F.; and
wherein the drilling fluid additive includes asphalt particles with an average particle size of 0.1 micron to 10 microns.

11. The drilling fluid of claim 10, wherein the asphalt includes at least one of propane distilled asphalt or polymer modified asphalt.

12. The drilling fluid of claim 10, wherein the drilling fluid has an API fluid loss at 7.5 minutes of 0 mL to 0.5 mL.

13. The drilling fluid of claim 10, wherein the drilling fluid has an API fluid loss at 30 minutes of 0 mL to 3.5 mL.

14. The drilling fluid of claim 10, wherein the drilling fluid has an API filter cake thickness of 0.5 mm to 3 mm.

15. The drilling fluid of claim 10, wherein the drilling fluid has an HTHP fluid loss of 0 mL to 3.5 mL per 30 min at 250° F.

16. The drilling fluid of claim 10, wherein the drilling fluid has an HTHP filter cake thickness of 0.5 mm to 3.5 mm.

17. A method of making a drilling fluid additive comprising the steps of:
mixing at least one emulsifier, cellulose ether, and water to form a water-based solution;
heating a water-dispersible asphalt to above 300° F., wherein the asphalt has a softening point of 160° F. to 212° F., a penetration depth of 0 mm to 45 mm, and a viscosity of 200 cP to 800 cP at 350° F.; and
adding the asphalt to the water-based solution in a colloid mill to form an emulsion,
wherein the emulsion includes asphalt particles with an average particle size of 0.1 micron to 10 microns, and
wherein the emulsion comprises:
50% to 70% by weight asphalt,
0.5% to 10% by weight of at least one emulsifier,
0.05% to 0.5% by weight cellulose ether, and
25% to 50% by weight water.

18. The method of claim 17, further comprising adding an acid or alkali neutralizer to the emulsifier.

19. The method of claim 17, wherein the asphalt includes at least one of propane distilled asphalt or polymer modified asphalt.

20. The method of claim 17, wherein the at least one emulsifier comprises at least one of an anionic rapid setting emulsifier, a medium setting emulsifier, a slow setting emulsifier, or mixtures thereof.

* * * * *